Jan. 7, 1958
H. M. ALT
2,818,993
PRESSURE VESSEL CLOSURE
Filed Nov. 28, 1955
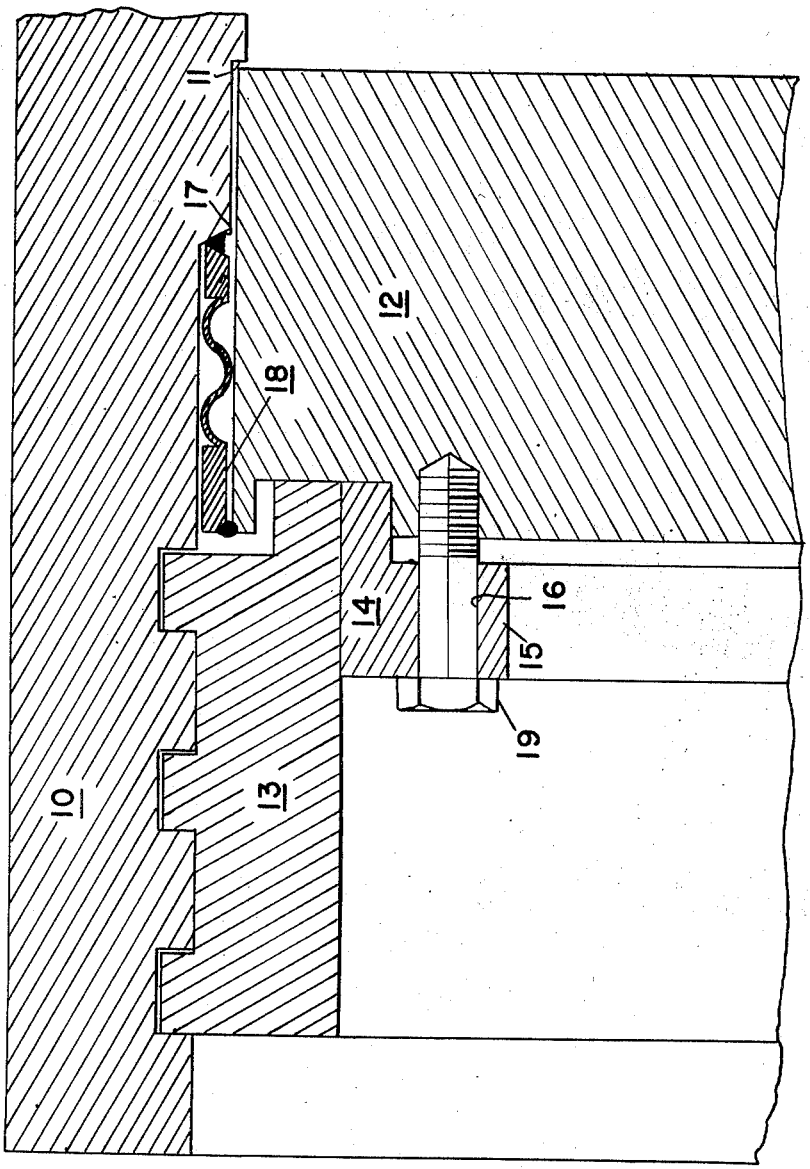
HAROLD M. ALT
*INVENTOR.*
BY *Maurice W. Grady*
ATTORNEY

United States Patent Office 2,818,993
Patented Jan. 7, 1958

2,818,993

PRESSURE VESSEL CLOSURE

Harold M. Alt, Dunkirk, N. Y., assignor to Alco Products, Incorporated, New York, N. Y., a corporation of New York Application November 28, 1955, Serial No. 549,231

1 Claim. (Cl. 220—46)

This invention relates to closures for high pressure vessels and particularly to a novel arrangement of such a closure whereby effective sealing is accomplished.

In many high pressure closures for heat exchangers in present day use, gaskets are used to seal the joint between the shell and the cover and are usually seated or compressed by the use of bolts. The differential rate of expansion between the shell and cover often loosens the seal and thereby permits leakage through the joint. Further tightening of the bolts is then necessary. In order to minimize this condition, it is necessary to start-up the operation of such heat exchangers slowly in order to control the rate of expansion. The present invention eliminates the use of bolted and gasketed joints and thus avoids the danger of leakage under thermal shocks.

The principal object of this invention, therefore, is to provide a novel sealed closure for a high pressure vessel which includes an expansible seal of the bellows type arranged between the cover and shell, such a seal permitting a quick start-up of the operation of the heat exchanger with no requirement that the rate of expansion be controlled. Another object is to provide such a closure in which a novel sealing means is arranged between the cover and barrel without recourse to bolts and gaskets. Still another object is to provide such a closure in which a bellows type expansible seal is welded to the cover and shell to seal the joint therebetween. Another object is to provide a bellows type expansible seal located in a plane parallel to the longitudinal axis to provide optimum application of expansion operation. A still further object of this invention is to provide a bellows type seal welded to the shell and to the cover which is accessible at the cover weld without removing the cover. Other and further objects of this invention will be apparent from the following description, the accompanying drawing, and the appended claim.

Referring now to the drawing, there is shown a fragmentary sectional view of a head for a high pressure vessel such as a heat exchanger of the shell and tube type in which the barrel 10 is formed with a shoulder 11 to provide a temporary stop for cover 12 to limit its inward movement during the assembly of the closure in the shell. A conventional segmented shear ring 13 serves to hold the cover in axial position when the latter is subjected to the hydrostatic pressure of the fluid contained in the shell. Shear ring 13 is radially supported by the continuous retaining ring, 14, the latter having an inwardly directed flange 15 thereon provided with a series of bolt holes 16 for purposes later described. Barrel 10 has a cut-out portion at its forward or open end, the rear end of said portion terminating in a square or tapered shoulder 17. Welded to shoulder 17 is an annular bellows seal 18 which extends forward to the outer end of the cover to which it is also welded. An effective seal is thus provided which will prevent leakage resulting from the differential of expansion between the shell and cover.

To assemble the closure, the bellows seal is first inserted into the barrel and its rear end is welded to shoulder 17. The cover is then inserted through the bellows until it encounters shoulder 11. The forward end of the bellows is thereupon welded to the forward end of the cover. Shear ring 13 is then installed in segments and ring 14 is located to hold the segments of the shear ring in assembled position. Bolts 19 are inserted through holes 16 and are threaded into the cover to secure ring 14 thereto.

While there has been hereinbefore described an approved embodiment of this invention, it will be understood that many and various changes and modifications in form, arrangement of parts and details of construction thereof may be made without departing from the spirit of the invention, and that all such changes and modifications as fall within the scope of the appended claim are contemplated as a part of this invention.

What I claim is:

In a pressure vessel closure of the class which has a removable cover disposed within a cylindrical shell and held against hydrostatic pressure by a shear ring, the cover and shell forming an annular joint therebetween, a sealing device for such joint comprising a shoulder in the shell opposite the cover and inward of the shear ring and an annular bellows seal extending axially of the shell, the inner edge of the seal being welded to the shell shoulder and the outer edge of the seal being welded to the cover, the arrangement of the seal being such that it expands axially to compensate for any differential in thermal expansion between the shell and cover.

References Cited in the file of this patent

UNITED STATES PATENTS

| | | |
|---|---|---|
| 1,902,494 | Emmet | Mar. 21, 1933 |
| 2,647,656 | Frisch | Aug. 4, 1953 |
| 2,711,266 | Kopp | June 21, 1955 |